May 29, 1923.
C. L. M. PETERSEN
DRYING CABINET
Filed Dec. 28, 1921  2 Sheets-Sheet 1
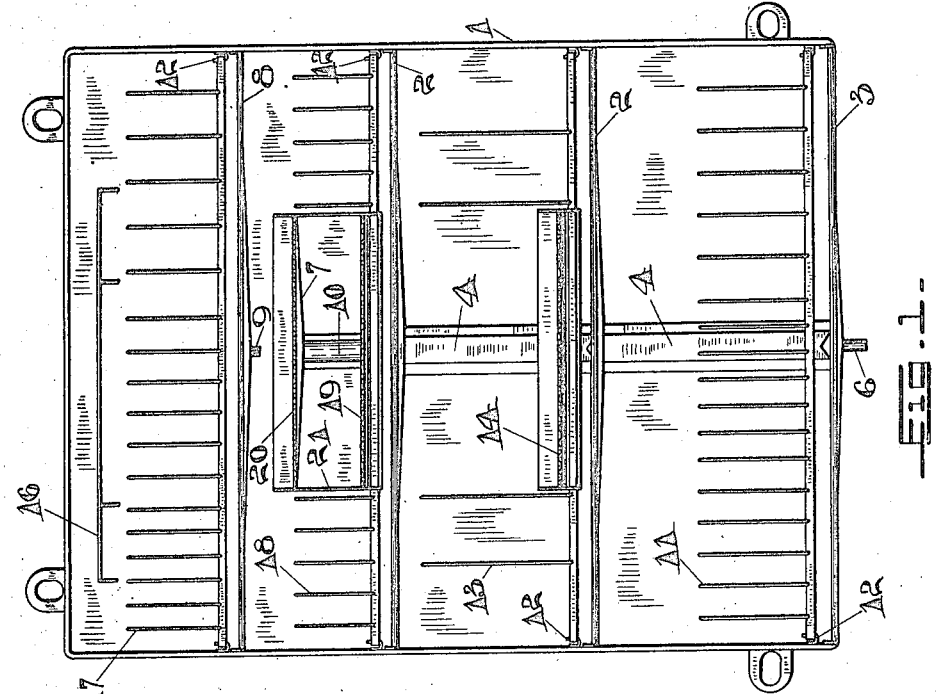
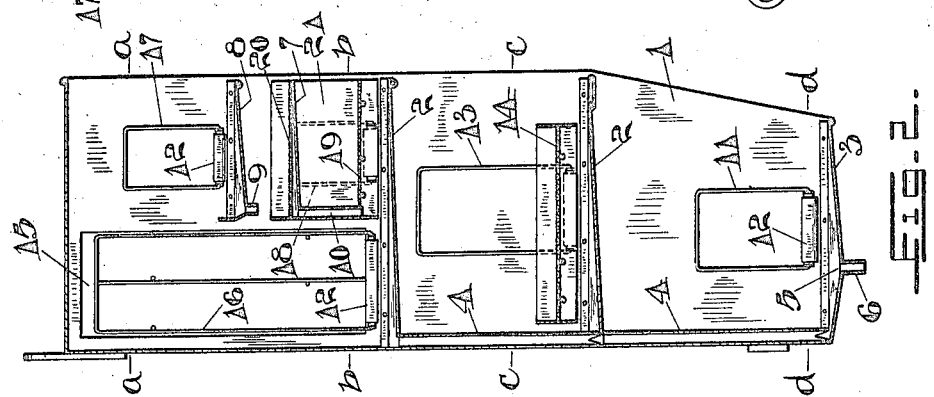
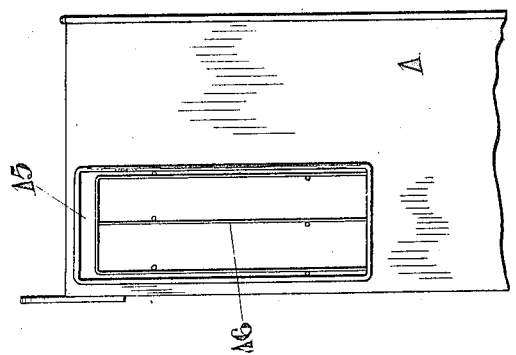
INVENTOR
C.L.M. Petersen
BY J. Edward Maybee
ATTY.

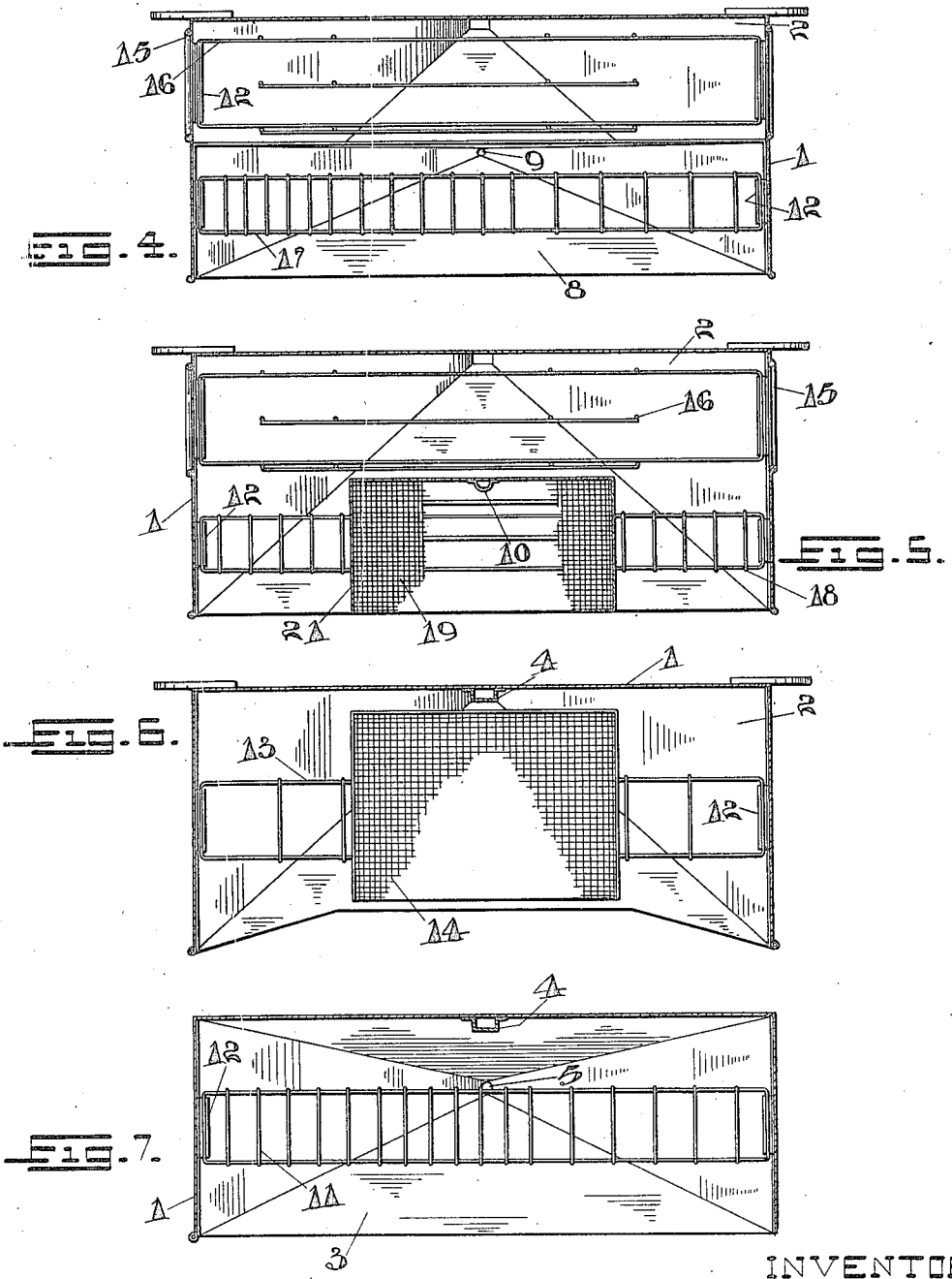

Patented May 29, 1923.

1,456,711

UNITED STATES PATENT OFFICE.

CASPER L. M. PETERSEN, OF TORONTO, ONTARIO, CANADA.

DRYING CABINET.

Application filed December 28, 1921. Serial No. 525,476.

*To all whom it may concern:*

Be it known that I, CASPER L. M. PETERSEN, of the city of Toronto, in the county of York, Province of Ontario, Canada, a subject of the King of Great Britain, have invented certain new and useful Improvements in Drying Cabinets, of which the following is a specification.

This invention relates to devices in which table dishes and the like may be placed to drain and dry, and my object is to devise a simple, sanitary and compact cabinet of large capacity relative to its overall dimensions in which dishes may be easily placed in suitable racks and drained and dried and stored without the drainings from dishes in the upper racks interfering with the drying of dishes in the lower rack.

I attain my object by means of the constructions hereinafter described and illustrated in the accompanying drawings in which Fig. 1 is a front elevation of the cabinet;
Fig. 2 a vertical section of the same;
Fig. 3 a side elevation of the same, partly broken away; and
Figs. 4, 5, 6 and 7 horizontal sections respectively on the lines $a$—$a$, $b$—$b$, $c$—$c$ and $d$—$d$ of Fig. 2.

In the drawings like numerals of reference indicate corresponding parts in the different figures.

1 is a sheet metal casing which is open at the front. In this casing are supported a plurality of drip pans 2. Preferably three such drip pans are employed, each of which extends from side to side and back to front of the casing. The drip pans 2 are preferably of the same dimensions, while the drip pans 3 at the bottom of the casing has less depth than the others, as the sides of the cabinet preferably recede below the lower pan 2 so that the device will not interfere with the proper use of the sink, above which in practice it will be supported. The drip pans 2 preferably incline from all sides toward a point at the middle of the rear side thereof so that all drainings will run to this point where an opening is formed communicating with a drain pipe 4. The drain pipe 4 of the upper drip pan 2 communicates with the upper end of the drain pipe of the lower drip pan, this in turn discharges on to the drip pan 3. The bottom of this lower drip pan inclines from all sides to an opening 5 forward of the back of the pan, and a drain tube 6 is preferably provided. This drain tube will thus clear the back of the sink above which the device, when in use, is supported. Above the upper drip pan 2 are supported a plurality of drip pans which are located above the front part of the said drip pan 2, but extend only part way towards the back. I prefer to employ two such drip pans. The lower drip pan 7 is carried by supports 21 from the dish supporting rack 18 hereinafter described, and extends only part way to each side of the casing. The drip pan 8 is carried by the sides of the casing and extends from side to side thereof above the drip pan 7. The drip pan 8 is of the same general construction as the drip pan 2 and is provided with a drainage discharge 9, which discharges into the drip pan 7 at the back thereof. The drip pan 7 is provided with a drainage discharge 10, which discharges onto the upper drip pan 2 at about the middle thereof. Means for supporting dishes of various kinds are provided above the various drip pans. Above the drip pan 3, a wire rack 11 is provided for this purpose, this rack being supported on the U-shaped ledges 12 secured to the end of the casing. This rack is particularly adapted to receive large size plates. A wire rack 13 is supported above the lower drip pan 2 in the same manner as the rack 11. The members of this rack at each end are, however, widely spaced to receive vegetable dishes and the like, while at the centre is carried a flat wire grid 14 on which various articles may be laid. Owing to the location of the drip pans 7 and 8, the back part of the casing above the rear part of the upper drip pan 2 is not accessible from the front of the casing. I therefore provide in each end of the casing an opening 15 and locate above the back part of the upper drip pan 2 a wire rack 16, which is supported on the ends of the casing in the same manner as the racks 11 and 13 and which is adapted to receive platters and the like which are easily inserted and removed through the openings 15. Above the drip pan 8 is located a wire rack 17 supported from the ends of the casing in the same manner as the racks 11 and 13. This rack will be proportioned to receive articles of various sizes. The wire rack 18, which carries the drip pan 7, is supported at the ends of the casing in the same manner as the racks hereinbefore described. The vertical members of this rack are, however, located only between the ends of the drip pan 7 and the sides of the casing. Below the drip pan 7 there is employed instead a flat wire grid 19, on which cups, cutlery or light small articles may be laid. A similar grid 20 is supported on the drip pan 7.

It will be noted that the dish racks are sufficiently elevated to prevent their contents touching the drip pans so that all the drainings therefrom may drip freely away. As the racks are all detachably connected with the casing, they are readily removed at any time for cleaning and, when they are removed, free access to the drip pans is obtained so that these latter may also be properly cleaned.

From the above description, it will be seen that I have devised a drying cabinet to satisfactorily attain the objects of my invention as set out in the preamble to this specification.

What I claim as my invention is:—

1. A drying cabinet comprising a casing open at the front; a plurality of drip pans supported therein at different levels, each upper pan having its bottom sloping from the ends and front to the middle of its back edge and connected to the back of the cabinet, removable racks supported above said pans; a drainage discharge from the lowermost pan; and means for leading the drainage of the upper pans to the same discharge point without interference with dishes supported in the racks.

2. A drying cabinet comprising a casing open at the front; a plurality of drip pans supported therein at different levels, each upper pan having its bottom sloping from the ends and front to the middle of its back edge and connected to the back of the cabinet; removable racks supported above said pans; a drainage discharge from the lowermost pan; and a tube common to the upper pans secured against the back of the casing and having openings therein at the middle of the back of each upper pan.

3. A drying cabinet comprising a casing open at the front; a drip pan supported in said casing and extending from back to front thereof, an opening being formed in the side of the casing above the back part of said pan; a drip pan supported above the first drip pan but extending only part way towards the back of the cabinet and adapted to drain to the middle of the first pan; a rack for dishes supported above the second drip pan accessible from the front; and a rack for dishes supported above the back part of the first drip pan accessible through the opening in the side of the casing.

4. A drying cabinet comprising a casing open at the front; a drip pan supported in said casing and extending from back to front thereof, an opening being formed in one side of the casing above the back part of said pan; a drip pan supported above the front part of the first drip pan and extending only part way towards the sides of the casing; a dish supporting grid carried by said drip pan; a third drip pan supported over the second of substantially the same depth as said second pan but extending substantially from side to side of the casing; a rack for dishes supported over the third drip pan accessible from the front of the casing; a rack for dishes supported above the back part of the first drip pan accessible through the opening in the side of the casing; racks for dishes at each side of the front part of said first drip pan accessible from the front of the casing; and means for draining said second and third drip pans to the first.

5. A drying cabinet comprising a casing open at the front; a drip pan supported in said casing and extending from back to front thereof, an opening being formed in one side of the casing above the back part of said pan; a drip pan supported above the front part of the first drip pan and extending only part way towards the sides of the casing; a third drip pan supported over the second of substantially the same depth as said second drip pan but extending substantially from side to side of the casing; dish supporting means above said racks accessible through the front of the casing; dish supporting means above the back part of the first pan accessible through the opening in the side of the casing; and means for draining said second and third drip pans to the first.

6. A drying cabinet comprising a casing open at the front; a plurality of drip pans supported in said casing, extending substantially from back to front and draining towards the back; drain pipes at the back of the casing draining the upper pans to the lower; a discharge pipe leading from the lowest drip pan from a point forward of its rear side; and drip pans supported over one of the upper pans extending only part way towards the back of the casing and draining into said pan; supporting means for dishes over said racks accessible from the front; and supporting means for dishes over the rear part of the aforesaid upper pan accessible from one side.

Signed at Toronto, Canada this 13th day of December 1921.

CASPER L. M. PETERSEN.